Figure 3:
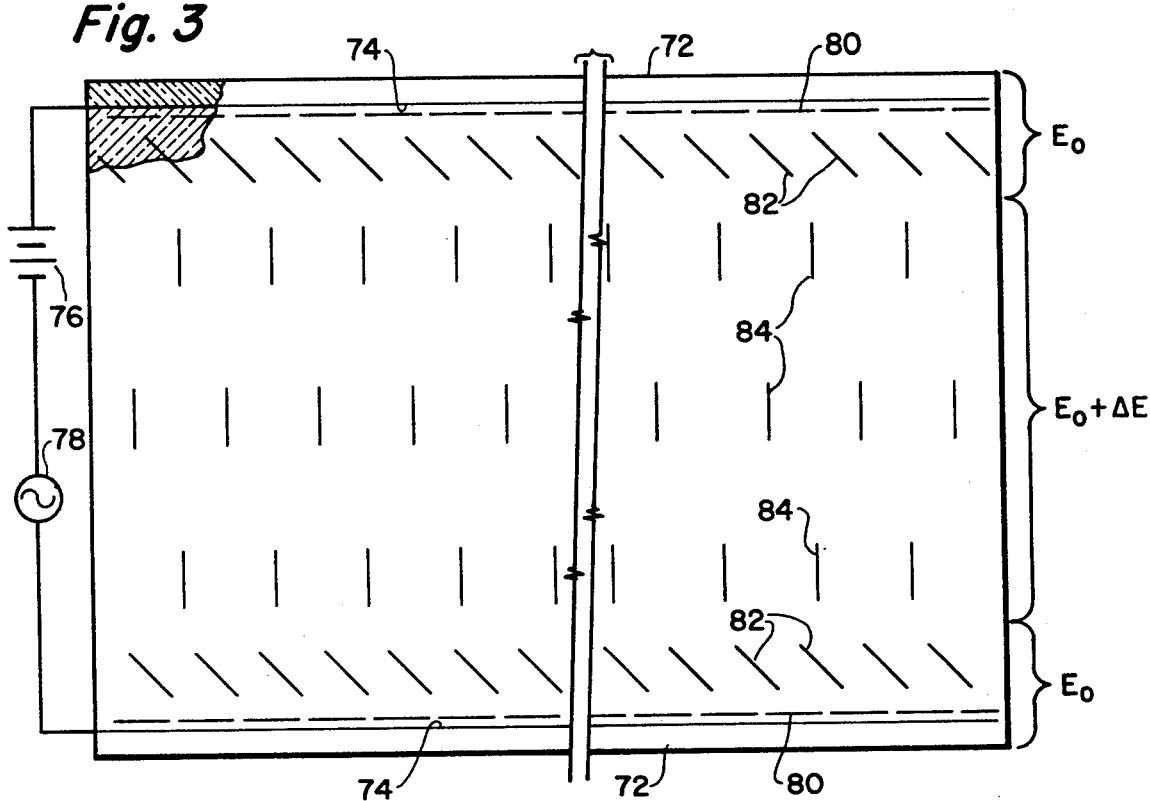

United States Patent [19]

Fergason

[11] 4,385,806
[45] May 31, 1983

[54] LIQUID CRYSTAL DISPLAY WITH IMPROVED ANGLE OF VIEW AND RESPONSE TIMES

[76] Inventor: James L. Fergason, 5806 Horning Rd., Kent, Ohio 44240

[21] Appl. No.: 121,071

[22] Filed: Feb. 13, 1980

Related U.S. Application Data

[63] Continuation-in-part of Ser. No. 913,618, Jun. 8, 1978, abandoned.

[51] Int. Cl.³ ............................................. G02F 1/113
[52] U.S. Cl. ................................. 350/347 R; 350/332; 350/387
[58] Field of Search ............... 350/347 R, 331 R, 334, 350/387, 332, 346

[56] References Cited

U.S. PATENT DOCUMENTS

| | | | |
|---|---|---|---|
| 2,705,903 | 4/1955 | Marshall | 350/387 |
| 3,705,310 | 12/1972 | Wild | 350/342 |
| 3,781,088 | 12/1973 | Tsukamoto et al. | 350/346 |
| 3,790,251 | 2/1974 | Wysocki et al. | 350/346 |
| 3,923,379 | 12/1975 | Kumada | 350/387 |
| 4,136,933 | 1/1979 | Adams et al. | 350/341 |

FOREIGN PATENT DOCUMENTS

| | | | |
|---|---|---|---|
| 1404945 | 9/1975 | United Kingdom . | |
| 1453733 | 10/1976 | United Kingdom . | |
| 1462978 | 1/1977 | United Kingdom | 350/347 R |
| 1463979 | 2/1977 | United Kingdom | 350/346 |
| 1466715 | 3/1977 | United Kingdom . | |
| 1499453 | 2/1978 | United Kingdom . | |

*Primary Examiner*—Vincent P. McGraw
*Attorney, Agent, or Firm*—Thomas H. Murray

[57] ABSTRACT

A nematic liquid crystal light shutter with improved angle of view by the incorporation of retardation plate means disposed in front of the liquid crystal cell to compensate for the off-axis performance of the device due to the birefringent nature of the liquid crystal material. When the transparent plates of the liquid crystal display are rubbed or otherwise aligned at right angles to each other to effect a twisted-nematic structure, two retardation plates are employed, the net retardation of each being less than or equal to the net retardation of the liquid crystal material itself. On the other hand, when the plates are rubbed or otherwise aligned parallel to each other, three retardation plates can be employed. The retardation plates can be incorporated into the front polarizer which is to be used on the display. Also disclosed is a liquid crystal display device having an exceedingly high speed of response.

12 Claims, 4 Drawing Figures

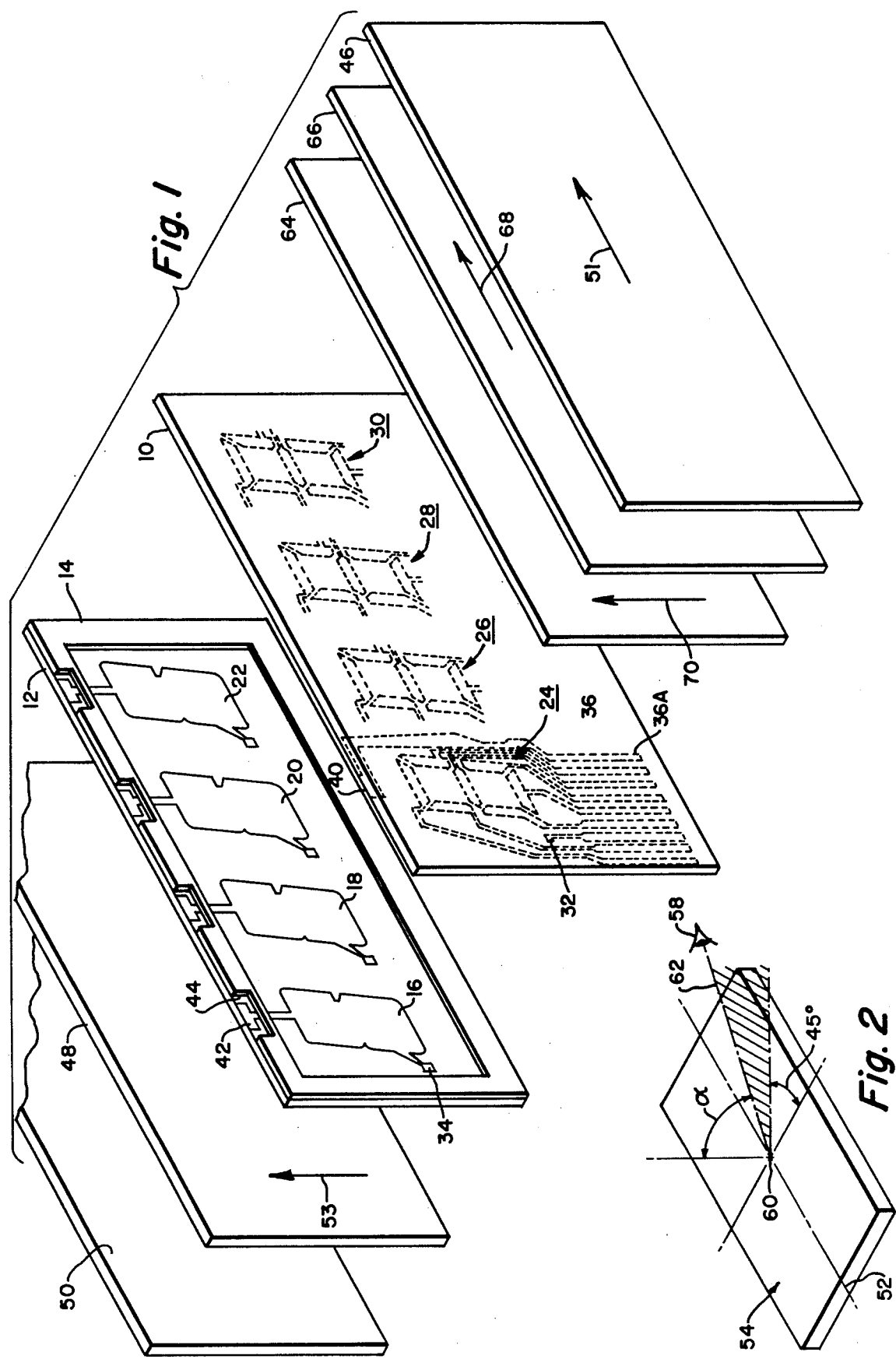

LIQUID CRYSTAL DISPLAY WITH IMPROVED ANGLE OF VIEW AND RESPONSE TIMES

CROSS-REFERENCE TO RELATED APPLICATION

This application is a continuation-in-part of application Ser. No. 913,618, filed June 8, 1978, now abandoned.

BACKGROUND OF THE INVENTION

While not necessarily limited thereto, the present invention is adapted for use in field-effect liquid crystal light shutter displays such as those shown in U.S. Pat. No. 3,731,986, issued May 8, 1973. Light shutters of this type comprise a layer of nematic liquid crystal material sandwiched between a pair of parallel transparent plates, the plates being coated on selected areas thereof with transparent conducting material to form an alpha-numeric display. The surfaces of the plates in contact with the liquid crystal material are rubbed or otherwise aligned at right angles to each other to effect a twisted-nematic structure. Application of an electrical potential between the transparent conducting coatings will cause the nematic structure to rotate or untwist. By providing polarizers on opposite sides of the display, polarized light can be made to pass through the structure or be blocked, depending upon whether the polarizers are crossed or parallel to each other.

When a liquid crystal display of the type described above is viewed along the axis of the display (i.e., at right angles to the aforesaid transparent plates), the indicia formed by the alpha-numeric display can be readily viewed as the display is rotated through 360°. Since, however, the liquid crystals are generally birefringent, the off-axis performance of the device is not uniform as the display is rotated through 360°. Assume, for example, that the device is being viewed at an angle of 45° with respect to the axis of the display. As it is now rotated through 360°, it will be seen that the off-axis directions which are parallel and perpendicular to the axis of the front polarizer on the display have good viewing. However, in-between these positions, and particularly when the display is rotated through 45° from a position where the viewing angle is perpendicular or parallel to the axis of the polarizer, the image becomes more or less blurred and is exceedingly difficult to view.

It has been determined that this effect is caused by the birefringence of the liquid crystal material which is oriented normal to the surface of the aforesaid transparent plates. This effect can be very disturbing in displays with reasonable thickness; and although the effect can be reduced by making thin displays, such thin displays have a tendency to show dispersion due to differences in the index of refraction at different wavelengths, thus causing disturbing colors when the display is not activated.

Another disadvantage of present-day liquid crystal light shutters is their relatively slow response times which limits their use as television display panels and the like. For example, turn-off times of 250 to 300 milliseconds are common in liquid crystal light shutters of the twisted nematic type. Various techniques have been employed to improve the response time of liquid crystal light shutters of this type by the addition of a small amount of twisted cholesteric liquid crystal material to the nematic liquid crystals. Such efforts, however, have not increased the response time above the millisecond range. Moreover, the relatively slow response time of liquid crystal displays limits their use with time-shared multiplexing driving circuitry.

SUMMARY OF THE INVENTION

The present invention resides in the discovery that the off-axis performance of liquid crystal displays of this type can be alleviated by providing at least two retardation plate devices whose slow axes are at right angles to each other, with the net retardation of each being equal to or less than the net retardation of the liquid crystal cell. In this manner, the normal component of the birefringence of the cell is compensated for when the device is ON; and the off-axis viewing performance is improved. The principle can also be used to generate relatively wide-angle, high-speed modulators using linearly-oriented liquid crystal devices and having response times of as little as 10 to 100 microseconds. If a liquid crystal cell is oriented such that the surfaces are rubbed or otherwise aligned parallel to each other, the viewing aperture of the cell can be expanded tremendously by placing two retardation plates, equivalent to the retardation of the nematic liquid crystal, next to the cell at right angles to each other and respectively parallel to two crossed polarizers. Furthermore, by adding a third retardation plate oriented at right angles to the rubbed or otherwise aligned direction of the liquid crystal and oriented at 45° to the polarizer, the characteristic of this type of device, which is its inability to work at zero order, can be further corrected such that the birefringence of the liquid crystal at the desired average drive level is equal to the retardation of the added wave plate.

Figure 4:
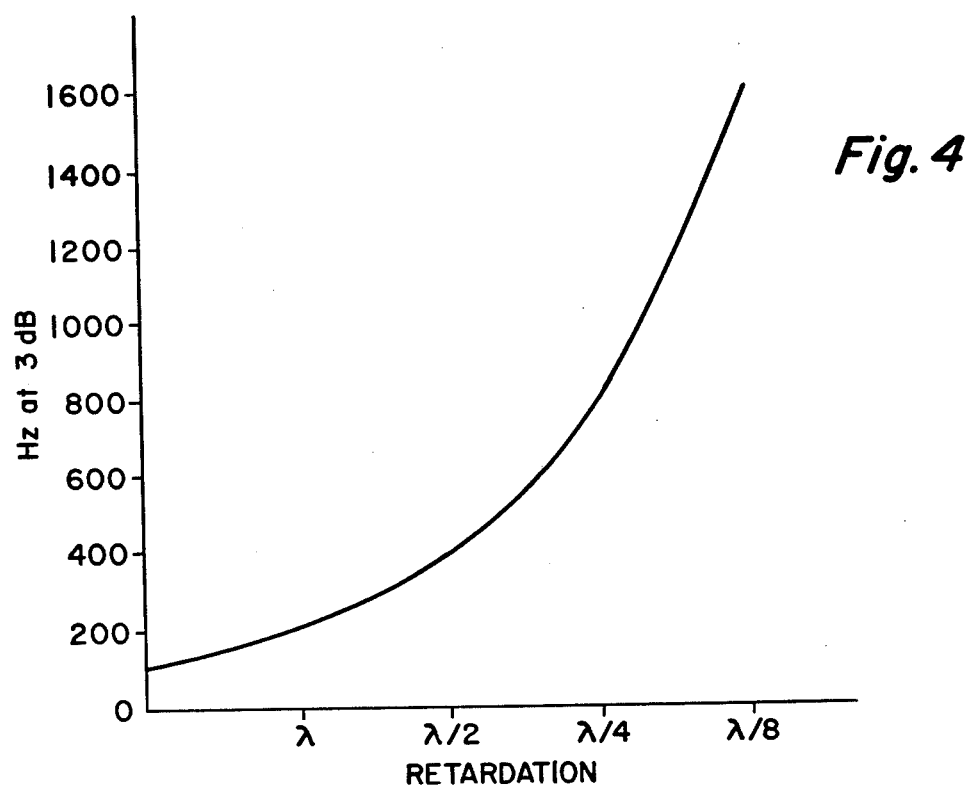

The above and other objects and features of the invention will become apparent from the following detailed description taken in connection with the accompanying drawings which form a part of this specification, and in which:

FIG. 1 is an exploded view of an embodiment of the invention as applied to a twisted-nematic cell structure;

FIG. 2 schematically illustrates the off-axis characteristics of a conventional liquid crystal cell which are corrected by the present invention;

FIG. 3 is a cross-sectional view of a liquid crystal cell showing the effect of a fixed bias on the molecules of a nematic liquid crystal material; and FIG. 4 is a plot of sine-wave response versus retardation for the cell of FIG. 3.

With reference now to the drawings, and particularly to FIG. 1, the liquid crystal cell shown is of the field-effect light shutter type described in the aforesaid U.S. Pat. No. 3,731,986. It comprises a pair of transparent plates 10 and 12 separated by means of a gasket 14 which spaces the plates in an amount equal to about 0.0005 inch. In the space between the plates 10 and 12 and within the enclosure formed by the gasket 14 is a layer of liquid crystal material. For purposes of the present description, it will be assumed that the liquid crystal material is of the nematic type having a positive dielectric anisotropy as taught in Fergason U.S. Pat. No. 3,918,796.

As shown in FIG. 1, the opposing surfaces of the transparent plates 10 and 12 have formed thereon patterns of transparent conducting material such as tin oxide or indium oxide. The plate 12 is provided with four patches of transparent conducting material 16, 18, 20 and 22; while the other transparent plate 10 is provided with four sets of mutually-insulated strips of transparent conducting material, the four sets being identified generally by the reference numerals 24, 26, 28 and 30. When the plates 10 and 12 are bonded to opposite sides of the gasket 14, the transparent conductive patches 16–22 will be aligned with the sets of strips 24–30 on the plate 10. A dot or decimal point 32 for each of the sets of strips on plate 10 is aligned with a corresponding dot 34 on the plate 12.

The operation of the liquid crystal cell will be described hereinafter; however, it will be appreciated that when all of the strips of the set 24, for example, are opaque while the surrounding areas transmit light, the resulting configuration will represent the numeral "8". Similarly, by causing selected ones of the strips in set 24, for example, to become opaque, any numeral from 1 through 0 can be made to appear.

The various mutually-insulated conductive strips in the sets 24–30 are adapted to be connected through a plurality of mutually-insulated strips of transparent conducting material 36 to external leads, not shown. In this respect, it will be appreciated that the lower end of the plate 10 with the strips 36 thereon extends beneath the remainder of the liquid crystal cell in order that a suitable electrical connector can be slipped over the lower portion of the plate 10 to connect the conducting strips 36 to external electrical circuitry. Note that the strip 36A extends from the bottom of plate 10 all the way to the top thereof where it terminates in a horizontal portion 40 which is directly opposite a corresponding horizontal portion 42 connected to the patch 16 of electrically-conductive material on plate 12. An electrically-conductive epoxy material or the like is placed in opening 44 in the gasket 14 so as to interconnect the portions 40 and 42. With this arrangement, the terminal of a potential source can be connected to the strip 36A and, hence, to the conductive patch on one side of the liquid crystal material; while selected ones of the remaining strips 36 can be connected to the other terminal of the same potential source, thereby establishing a potential gradient resulting in an electrical field across the liquid crystal material in selected areas, depending upon which ones of the strips 36 are energized (i.e., connected to the other terminal of the potential source).

In the manufacture of the liquid crystal unit, the layers of transparent conductive material which are in contact with the nematic-phase liquid crystal material may be prepared by being stroked or rubbed or otherwise aligned unidirectionally with a cotton cloth, for example, or by otherwise being treated to orient the liquid crystal molecules in one direction. Furthermore, the transparent conductive material on plate 10 is rubbed or otherwise aligned unidirectionally at right angles to the direction of rubbing or other alignment of the transparent conductive material on plate 12. The effect of this is to produce a twisted-nematic structure of the intervening liquid crystal material as is more fully explained in the aforesaid U.S. Pat. No. 3,731,986. In contact with the plate 10 is a first polarizing plate 46, and on the backside of the plate 12 is a second polarizing plate 48. The planes of polarization of the two plates 46 and 48 are at right angles to each other, the plane of polarization of the plate 46 being parallel to the direction of rubbing or other alignment of the transparent conductive material on plate 10 and the plane of polarization of plate 48 being parallel to the direction of rubbing or other alignment on plate 12. Finally, behind the second polarizer 48 is a reflector 50, which is the subject of U.S. Pat. No. 3,881,809, issued May 6, 1975.

In essence, it is a reflector which will scatter polarized light without depolarizing the same such that the display can be viewed with ambient light passing into the liquid crystal film from the front and then scattered from reflector 50. Alternatively, the reflector 50 can be eliminated and the display illuminated by a source of light from its backside, as is well known in the art.

In the operation of the device, ambient light impinging on the forward face of the plate 46 will pass through the plate as light polarized in the direction of rubbing or other alignment of the lines on the transparent conductive material of plate 10. This direction of polarization is indicated by the arrow 51 in FIG. 1. The polarized light, as it passes through the layer of liquid crystal material between the plates 10 and 12, will be rotated through 90°; and this 90° rotation will occur throughout the entire surface area of the layer of liquid crystal material, assuming that an electrical potential is not applied between the electrically-conductive coatings on the plates 10 and 12. The plane of polarization of polarizer 48 is at 90° with respect to that of polarizer 46 and is indicated by the arrow 53 in FIG. 1. Hence, with no electrical potential applied between the electrically-conductive films on plates 10 and 12, the polarized light will pass through the entirety of the liquid crystal cell, will be scattered from the reflector 50, and will again pass through polarizer 48, the liquid crystal cell and polarizer 46. Under these circumstances, the entire display will appear substantially white.

Now, if an electrical potential, on the order of 5 volts or greater, is applied between the conducting films on the plates 10 and 12, the liquid crystal unit will no longer rotate the plane of polarization through 90° in the areas of the energized strips on plate 10. Hence, under these circumstances, polarizer 48 will block the light in the areas across which an electrical potential exists; and the energized strips which are connected to the source of potential appear dark on a white background. Depending upon the strips which are energized, any numeral from 1 through 0 can be made to appear.

Instead of having crossed polarizers as in the embodiment of the invention just described, it is also possible to have parallel polarizers, in which case light will be blocked in the absence of an electrical potential applied across the liquid crystal layer. When a potential is applied, white numerals on a black background can be made to appear.

As was explained above, the liquid crystals utilized in a display such as that shown in FIG. 1 are birefringent. The effect of this is to generate a pattern dependent upon the viewing quadrant. This is illustrated, for example, in FIG. 2 where the liquid crystal cell is indicated by the reference numeral 54. The axis of polarization of the front polarizer is indicated by the reference numeral 56. Assuming that the numerals on the alpha-numeric display are viewed from vantage point 58 at an angle of 45° with respect to the surface of the front polarizer, and assuming further that the display 54 is rotated about its center point 60, it will be noted that when the line 62 between the vantage point 58 and the center point 60 is perpendicular and parallel to the polarization axis 56, the numerals in an alpha-numeric display, for example, will be clearly visible. However, between these points in the four quadrants of the display, the numerals will become blurred and almost disappear, the worst condition being at an angle of 45° with respect to the polarization axis 56. As a result, the viewing angle α at the 45° position with respect to the axis 56 can ordinarily be no greater than 20°.

In accordance with the present invention, the condition just described is alleviated by compensating for the normal component of the birefringence when the display is ON. This is achieved by the use of two retardation plates 64 and 66 (FIG. 1) which can be interposed between the polarizer 46 and the front transparent plate 10. The retardation plates 64 and 66 have their slow axes at right angles to each other, one axis being indicated by the arrow 68, which is parallel to the direction of polarization of polarizer 46, and the other retardation plate 64 having its slow axis 70 parallel to the direction of polarization of the polarizer 48. The arrows 68 and 70, it will be noted, are also parallel to the directions of rubbing on the respective transparent plates 10 and 12. The net retardation of each of the retardation plates 64 and 66 is equal to or less than the net retardation of the liquid crystal cell. This has the effect of increasing the viewing angle shown in FIG. 2 from less than 20° to at least 45°, the net result being a display which is viewable over a much wider angle of view. Since each retardation plate is parallel to one polarizer and perpendicular to the other, there is no net effect of the retardation plates at normal incidence, thus making a display of substantially increased performance in terms of viewing angle.

As light passes through the front polarizer 46, for example, it becomes unidirectional (i.e., has only one E vector extending parallel to the direction of arrow 51 in FIG. 1). As the polarized light passes through the retardation plates 66 and 64 it is broken into two vectors which are in quadrature, one vector being at right angles to the other. In accordance with the explanation given in the book "Optics" by Francis W. Sears, Addison-Wesley Press, Inc., 3rd Edition, 1949, one of these vectors is referred to as an "ordinary wave" and the other is referred to as an "extraordinary wave". When passing through the retardation plates, the ordinary wave is delayed or retarded with respect to the extraordinary wave. When passing through the liquid crystal layer itself, which is also birefringent, the foregoing effect is compensated for. Hence, the birefringent effect of the liquid crystal layer is effectively nulled out or eliminated. The effect on the light reflected from reflector 50 in passing back through the liquid crystal layer is the same except that the ordinary wave is initially retarded in the liquid crystal layer; and this is then compensated for by the retardation plates 64 and 66.

The retardation plates 64 and 66 may, for example, comprise two oriented plastic films (e.g., polyvinyl alcohol) such as used by commercial firms to manufacture retardation plates. However, since the retardation plates are relatively thin, they can be laminated and processed as part of the front polarizer 46, for example, with less than a 1-mil change in the overall thickness of the display. Materials which can be used for this purpose are polyvinyl butyral, which has been linearly oriented, polyvinyl alcohol, polyesters, such as mylar, which have been oriented, oriented films of cellulose acetate, cellulose butyrate, oriented polypropylene, polycarbonate, or any oriented film where the index of refraction in the direction of polarization perpendicular to the film is less than the index of refraction of the light polarized in the direction of orientation of the film. In most cases, optically-positive uniaxial films will be employed; however materials such as mylar which are biaxial with the proper orientation in the film can also be adopted as long as they are properly oriented with respect to the polarizer in the liquid crystal cell. Compensation can also be obtained by using a material with a negative optical sign oriented with the optical axis perpendicular to the plate.

The principle described above with respect to the device of FIG. 1 can also be used to generate relatively wide-angle, high-speed modulators using linearly-oriented liquid crystal devices. If a liquid crystal cell is oriented such that the surfaces are rubbed or otherwise aligned parallel, the cell can be made relatively thick, on the order of 2 to 3 mils, and a high voltage can be applied to the display. In this case, the thickness of the display becomes of reduced importance and the interaction of the electric field works principally at the surface. If a relatively high birefringence material is used, the effective thickness of the display acts as though it were only the interacting surface thickness; and, therefore, the response of the display becomes very rapid, responding in times as short as 10 to 100 microseconds. This easily allows voice modulation of the display since a fixed bias can be applied to the display; and any modulation can be superimposed upon a fixed bias. The effect or orientation is aided by the high dielectric coefficient which is generally parallel with the applied field in the center of the cell, causing the voltage to drop at the interfaces where the liquid crystal is aligned with the surface.

The foregoing principle is illustrated in FIG. 3 wherein a liquid crystal cell is shown including glass plates 72 coated with transparent conductive material 74 and rubbed or otherwise aligned parallel to each other. A fixed bias (i.e., battery 76) and high frequency signal source 78 are connected across the two conductive films 74. With this arrangement, the molecules of the liquid crystal 80 adjacent the transparent electrodes 74 will be parallel to those electrodes; the molecules 82 in the center of the cell will be normal to the electrodes; and the molecules 84 intermediate the molecules 80 and 82 will be tilted and will, in effect, be those whose orientation with respect to the electrodes (i.e., parallel or normal) will be controlled by the high frequency signal source 78 to render the cell opaque or transmitting. The molecules adjacent the plates 74 will have a dielectric constant equal to the ordinary dielectric constant $\epsilon_o$; while the intermediate, normal molecules 84 will have a dielectric constant equal to $\epsilon_o + \Delta\epsilon$, where $\Delta\epsilon$ is the dielectric anisotropy.

FIG. 4 illustrates the relation between retardation which decreases as the applied bias increases, and the sine-wave response of the device. Notice that as the bias increases, the retardation, measured in wavelengths, decreases while the sine-wave response increases.

The foregoing type of display, however, has two deficiencies. First, it cannot achieve a zero order with normally-incident light (i.e., the molecules will never be normal to the surface of the plate regardless of the applied voltage). Secondly, there is a relatively large birefringence in the center of the cell perpendicular to the liquid crystal cell surfaces which causes large phase shifts with respect to angle. This gives the device a very narrow aperture or viewing angle (i.e., angle $\alpha$ shows in FIG. 2). The aperture can be expanded tremendously by applying the principles of compensation (i.e., retardation plates) explained above. Thus, by placing two retardation plates equivalent to the retardation of the nematic liquid crystal next to the cell at right angles to each other and parallel to the front and rear polarizers, respectively, a very wide angle or large aperture shutter can be achieved which is extremely fast. The device can be driven, for example, with photoconductors, thin-film transistors or a number of other similar devices and will result in very high-speed operation. Because of the large non-linearity, it can also be adapted to multiplexing.

The other objection to linearly-oriented liquid crystal devices is their inability to work at zero order, explained above. This can be further corrected by the use of a third retardation plate such that the birefringence of the liquid crystal at the desired average drive level is equal to the retardation of the added wave plate. By doing this, the display can be used for black and white. The third retardation plate is oriented at right angles to the rubbed or otherwise aligned direction of the liquid crystal; while the transparent plates 10 and 12 in FIG. 1, for example, are oriented at 45° to the polarizer. Alternatively, the third retardation plate can have its slow axis extending parallel to the arrow 51 in FIG. 1, for example, and the plates 10 and 12 rubbed or otherwise aligned at an angle of 45° with respect to the top and bottom surfaces thereof. A total system for a wide-angle display can be as follows (with reference to FIG. 1): A front polarizer 46, two retardation plates 64 and 66, one (plate 66) having an axis oriented parallel to the direction of polarization 51 of polarizer 46 and the other oriented perpendicular to the arrow 51, a retardation plate (not shown in FIG. 1) oriented at 45° with respect to the arrow 51 with a retardation equivalent to the average modulation level, a liquid crystal cell oriented at 45° to the polarizer 46 and at right angles to the third retardation plate (again, not shown in FIG. 1), and a second polarizer oriented perpendicular to the polarizer 46. By using patterned electrodes, a number of numeric and alpha-numeric devices can be made. This device can be multiplexed at a higher level (i.e., higher speed) than the twisted-nematic device described above.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a liquid crystal light shutter of the type having a layer of uniaxial liquid crystal material sandwiched between parallel transparent plates, films of transparent conductive material on the plates, means for applying a potential between said films of transparent material to effect a light shutter action, and polarizers on opposite sides of said layer of liquid crystal material; the improvement which comprises at least two retardation plate devices operatively associated with said liquid crystal cell for compensating for the normal component of birefringence of said liquid crystal material, the optical axes of said retardation plate devices being parallel to the surfaces of the said retardation plate devices.

2. The improvement of claim 1 wherein said liquid crystal light shutter is a twisted-nematic liquid crystal light shutter.

3. The improvement of claim 1 wherein said liquid crystal light shutter comprises a layer of nematic liquid crystal material disposed between transparent plates which are effectively rubbed or otherwise aligned in directions parallel to each other.

4. The improvement of claim 3 including a third retardation plate whose slow axis is disposed at an angle of 45° with respect to the axes of polarization of said polarizers on opposite sides of said layer of liquid crystal material and at an angle of 90° with respect to the direction of rubbing or other alignment.

5. The improvement of claim 4 wherein said plates are effectively rubbed or otherwise aligned on the sides thereof in contact with said liquid crystal material, the rubbing or other aligment directions of the respective plates being parallel to each other and at an angle of 45° to the slow axis of said third retardation plate.

6. The improvement of claim 1 wherein the slow axes of the respective two retardation plates are at right angles to each other.

7. The improvement of claim 6 wherein the slow axes of the respective two retardation plates are parallel to the respective axes of said polarizers, said axes of the polarizers being at right angles with respect to each other.

8. The improvement of claim 1 wherein said retardation plate devices are laminated and comprise part of one of said polarizers.

9. The improvement of claim 8 wherein the retardation plate devices laminated and processed as part of one of said polarizers are formed from a material selected from the group consisting of polyvinyl butyral which has been linearly oriented, polyvinyl alcohol, a polyester which has been oriented, oriented films of cellulose acetate, cellulose butyrate, and oriented polypropylene and polycarbonate.

10. The improvement of claim 8 wherein the retardation plates laminated and processed as part of the polarizer comprise an oriented film wherein the index of refraction in the direction of polarization perpendicular to the film is less than the index of refraction of the light polarized in the direction of orientation of the film.

11. The improvement of claim 3 including means for applying a fixed bias across said liquid crystal layer, and means for superimposing on said fixed bias an oscillatory signal.

12. The improvement of claim 3 wherein said bias is such as to cause all molecules in said nematic liquid crystal layer, except those adjacent the transparent plates, to be normal to the transparent plates.

* * * * *